(12) United States Patent
Lu et al.

(10) Patent No.: US 11,908,037 B2
(45) Date of Patent: Feb. 20, 2024

(54) METHOD AND SYSTEM FOR LARGE-CAPACITY IMAGE STEGANOGRAPHY AND RECOVERY BASED ON INVERTIBLE NEURAL NETWORKS

(71) Applicant: Nankai University, Tianjin (CN)

(72) Inventors: Shaoping Lu, Tianjin (CN); Rong Wang, Tianjin (CN); Tao Zhong, Tianjin (CN)

(73) Assignee: Nankai University, Tianjin (CN)

( * ) Notice: Subject to any disclaimer, the term of this patent is extended or adjusted under 35 U.S.C. 154(b) by 0 days.

(21) Appl. No.: 17/436,755

(22) PCT Filed: Jun. 18, 2021

(86) PCT No.: PCT/CN2021/100758
§ 371 (c)(1),
(2) Date: Sep. 7, 2021

(87) PCT Pub. No.: WO2022/166073
PCT Pub. Date: Aug. 11, 2022

(65) Prior Publication Data
US 2024/0005440 A1 Jan. 4, 2024

(30) Foreign Application Priority Data
Feb. 4, 2021 (CN) .................. 202110155224.X (51) Int. Cl.
*G06T 1/00* (2006.01)
*H04N 1/32* (2006.01)
*G06N 3/0464* (2023.01)

(52) U.S. Cl.
CPC ....... *G06T 1/0021* (2013.01); *H04N 1/32347* (2013.01); *G06N 3/0464* (2023.01); *G06T 2201/0203* (2013.01)

(58) Field of Classification Search
CPC ............ H04N 1/32347; G06N 3/0464; G06T 1/0021; G06T 2201/0203
See application file for complete search history.

(56) References Cited

U.S. PATENT DOCUMENTS

2008/0199093 A1 8/2008 Shi et al.
2021/0118423 A1* 4/2021 Ping ................. G10L 13/047

FOREIGN PATENT DOCUMENTS

| CN | 107087086 A | 8/2017 |
|---|---|---|
| CN | 109818739 A | 5/2019 |
| CN | 112884630 A | 6/2021 |

OTHER PUBLICATIONS

Chang, Ching-Chun. "Adversarial learning for invertible steganography." IEEE Access 8 (2020): 198425-198435. (Year: 2020).*

(Continued)

*Primary Examiner* — Katrina R Fujita
(74) *Attorney, Agent, or Firm* — Marcus C. Dawes (57) ABSTRACT

The present disclosure provides a method and system for large-capacity image steganography and recovery based on an invertible neural networks. The method is intended to embed one or more hidden images into a single host image, and recover all the hidden images from a stego image. The method designs an image steganography model that supports bidirectional mapping. The model includes cascaded invertible modules containing a host branch and a hidden branch. A hidden image is embedded into a host image through forward mapping to form a stego image, and the host image and the hidden image are separated and recovered from the single stego image through reverse mapping.

14 Claims, 4 Drawing Sheets

(56) References Cited

OTHER PUBLICATIONS

Duan et al. "A new high capacity image steganography method combined with image elliptic curve cryptography and deep neural network." IEEE Access 8 (2020): 25777-25788. (Year: 2020).*
Liu et al. "Recent advances of image steganography with generative adversarial networks." IEEE Access 8 (2020): 60575-60597. (Year: 2020).*
Zhang et al. "Generative reversible data hiding by image-to-image translation via GANs." Security and Communication Networks 2019 (2019): 1-10. (Year: 2019).*
International Search Report dated Oct. 15, 2021 in related PCT/CN2021/100758.

* cited by examiner

Fig 4 (a) One image is hidden

FIG. 4 (b) Two images are hidden

METHOD AND SYSTEM FOR LARGE-CAPACITY IMAGE STEGANOGRAPHY AND RECOVERY BASED ON INVERTIBLE NEURAL NETWORKS

PRIORITY INFORMATION

This patent application is a U.S. National Stage filing of International Application No. PCT/CN2021/100758 filed Jun. 18, 2021, which claims priority to the Chinese Patent Application No. 202110155224.X, filed with the China National Intellectual Property Administration (CNIPA) on Feb. 4, 2021, and entitled "METHOD AND SYSTEM FOR LARGE-CAPACITY IMAGE STEGANOGRAPHY AND RECOVERY BASED ON INVERTIBLE NEURAL NETWORKS", which is incorporated herein by reference in its entirety.

TECHNICAL FIELD

The present disclosure relates to the field of information hiding, and in particular to a method and system for large-capacity image steganography and recovery based on an invertible neural networks.

BACKGROUND ART

Steganography is a technique that hides secret information by embedding it into a host medium. Different from the meaning of cryptography that hides information (in other words, makes it unintelligible), steganography aims to hide the existence of secret information. Accordingly, image steganography refers to the process of hiding information within an image file. The image chosen for hosting the hidden data is named host image, and the image containing the hidden information generated by steganography is called stego image. Nowadays, image steganography has been applied in many practical fields such as digital communication, copyright protection, information certification, and e-commerce.

A well-designed image steganography system is required to have both characteristics of good concealment and large payload capacity simultaneously. Firstly, the stego image should be as real as possible to avoid suspicion. This means that the hidden information should not be detected by the steganalysis tools against it. Therefore, image steganography essentially asks for a powerful image representation mechanism that can retain the noise introduced by the hidden image and effectively approximate the host image. Meanwhile, this process is also expected to be reversible, because the hidden images should be well recovered from the stego image in steganography recovery process. In addition, to make image steganography applications more efficient in practice, another important aspect is to embed as much hidden information as possible into the host image. A common index to measure an image steganography capacity is average hidden bits per pixel (bpp for short).

Image steganography has been extensively studied in academia. Traditional methods usually hide messages in the spatial domain, transform domain, or adaptive domain of the image. For most of them, the hidden information is embedded into the least significant bits (LSBs) of the host image or specific areas of the image that are found out with shallow vision descriptors, meaning that only a small amount of hidden information can be embedded, with a payload between 0.2 bpp to 4 bpp. Recently, some deep learning-based steganography methods have successfully found a feasible direction to improve the steganography capacity. Shumeet Baluja's paper *Hiding images in plain sight: Deep steganography* published on NIPS in 2017 proposes a method that can hide an image in another image of the same size, increasing the payload to 24 bpp. The model used in this method includes three parts: preprocessing, hiding, and recovery, with each part being a convolutional neural networks. Although these three networks can be trained in an end-to-end manner, the parameters of each part are different, and the qualities of the stego image and restored image have to be weighed. It is difficult to guarantee the concealment of the stego image and the high quality of the restored image at the same time. Shumeet Baluja's paper *Hiding images within images* published in TPAMI in 2020 improves the foregoing method, to hide two hidden images in one host image of the same size, but the steganography and recovery effects were not so satisfactory.

The existing methods have carried out a lot of explorations and attempts to enhance the steganography concealment and increase the steganography capacity, but there is still no good solution to deal with the problem of steganography and recovery of large-capacity image. Building a more effective neural networks to hide as many images as possible while ensuring the concealment of stego images is still the key to image steganography.

SUMMARY

An object of the present disclosure is to solve a problem of small capacity of existing image steganography method and which cannot obtain stego images and restored images with high quality at the same time, and proposes a method and a system for large-capacity image steganography and recovery based on an invertible neural networks, to embed one or more hidden images into a single host image, and recover all the hidden images from the stego image with high quality.

The technical solutions of the present disclosure are as follows.

A method and a system for large-capacity image steganography and recovery based on an invertible neural networks utilizes an invertible neural networks model that supports bidirectional mapping to complete tasks of embedding hidden images into a host image and recovering the hidden images from a stego image. The invertible neural networks model includes cascaded invertible modules containing a host branch and a hidden branch. Forward mapping embeds a hidden image into a host image to form a stego image, and reverse mapping separates and recovers the host image and the hidden image from the single stego image. The present disclosure specifically includes the following steps.

A first part: Embedding hidden images
  a. inputting the host image and the hidden image: importing one or more hidden images and a selected host image into a forward mapping input end of the invertible neural networks model as forward inputs;
  b. embedding image features: embedding feature information of the hidden image into the host image through the forward mapping of the invertible neural networks; and
  c. generating a stego image: taking forward output of a host branch of the invertible neural networks as the stego image, and specifying forward output of a hidden branch as a constant matrix containing no effective information;

A second part: Recovering the hidden images d. inputting the stego image: importing the stego image and the constant matrix obtained in step c into a reverse mapping input end of the invertible neural networks model as reverse inputs;

e. separating the image features: separating features of the host image and the hidden image from the stego image through the reverse mapping of the invertible neural networks; and f. recovering the hidden image: taking reverse output of the host branch of the invertible neural networks as a recovered host image, and reverse output of the hidden branch as a recovered hidden image.

The present disclosure builds a completely invertible image steganography and recovery network by cascading multiple invertible modules including deep neural networks. In this network, the forward mapping embeds the hidden image into the host image to hide information, and the reverse mapping extracts the hidden image from the stego image to recover the information. The network shares all parameters in the process of forward steganography and reverse recovery, making it possible to obtain stego images and recovered hidden images with high quality at the same time. Each invertible module includes two branches, respectively corresponding to host images and hidden images. Multiple images can be hided only by increasing the number of feature channels and the number of cascaded invertible modules for a neural networks feature extraction branch of the hidden image without changing the overall structure of the model, which makes larger-capacity image steganography possible.

Compared with the prior art, the present disclosure has the following advantages.

The image steganography method of the present disclosure takes full advantage of a bidirectional mapping feature of the invertible neural networks to implement image steganography and recovery by utilizing a single model. The steganography capacity has been doubled, when compared with traditional image steganography methods. Because all parameters are shared in the steganography and recovery processes, better practical results are obtained compared with other present deep learning methods.

BRIEF DESCRIPTION OF THE DRAWINGS

The present disclosure will be explained in detail with reference to the accompanying drawings.

DETAILED DESCRIPTION OF THE EMBODIMENTS

The technical solutions of the embodiments of the present disclosure are described in detail below with reference to the accompanying drawings of the embodiments of the present disclosure. Apparently, the described embodiments are merely a part rather than all of the embodiments of the present disclosure. All other embodiments obtained by those of ordinary skill in the art based on the embodiments of the present disclosure without creative labor should fall within the protection scope of the present disclosure.

Figure 1:
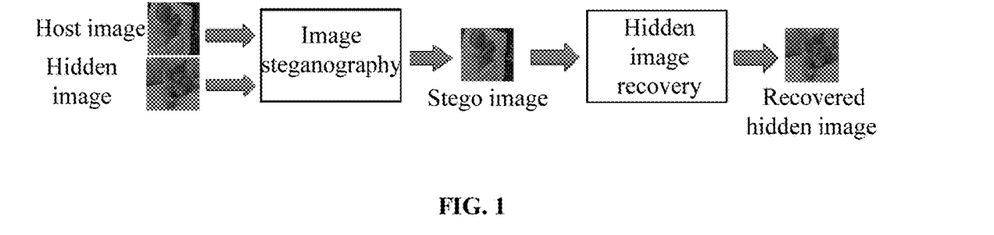
FIG. 1 is a schematic flow chart of image steganography and recovery according to the present disclosure.

FIG. 1 is a flow chart of image steganography and recovery. The general steps of image steganography and recovery shown in the figure include: determining a host image and hidden images, embedding the hidden images into the host image and obtaining a stego image similar to the host image through an "image steganography" process, and then reconstructing the stego image with hidden information through a "hidden image recovery" process to obtain all the hidden images.

Figure 2:
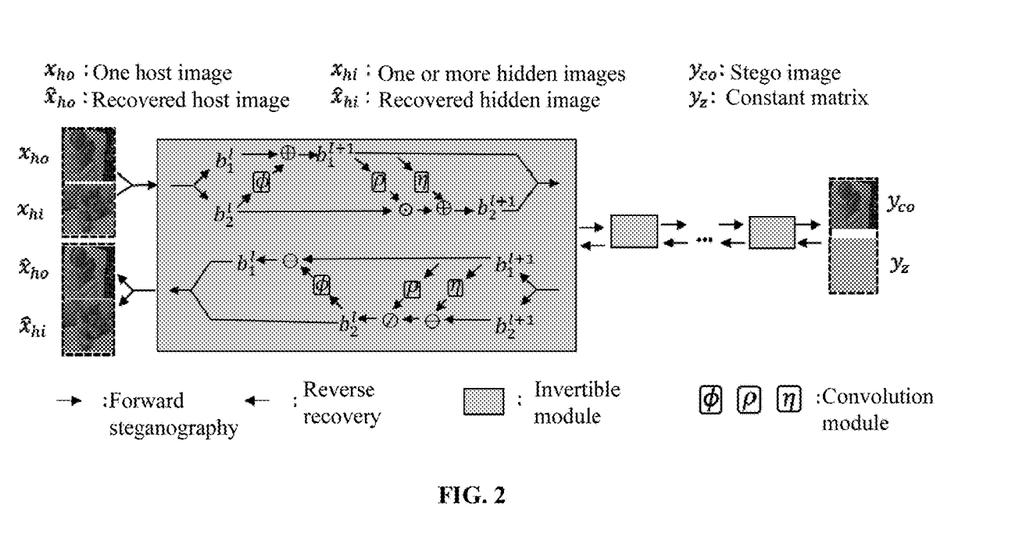
FIG. 2 is a schematic diagram of a model of an invertible neural networks designed according to the present disclosure.
Figure 3:
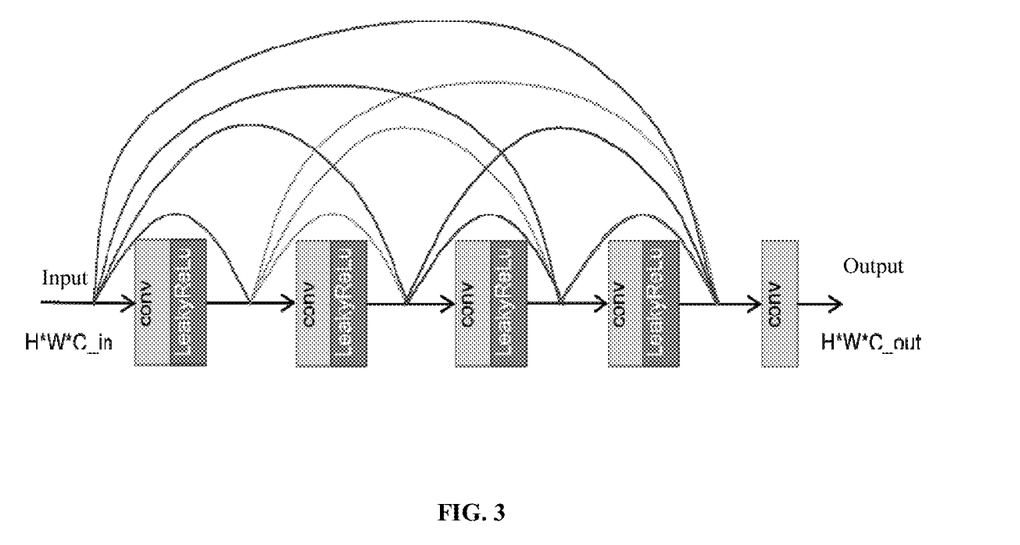
FIG. 3 is a schematic diagram of a model of a sub-block of DenseBlock utilized in the present disclosure.

FIG. 2 shows a structure of a model of an invertible neural networks. A method for large-capacity image steganography and recovery based on the invertible neural networks includes:

a. inputting the host image and the hidden images: importing a 3(n+1)×H×W tensor composed of an H×W host image $x_{ho}$ and n (n≥1) hidden images $x_{hi}$, of the same size into the invertible neural networks model of forward mapping;

b. embedding image features: embedding feature information of the hidden images $x_{hi}$ into the host image $x_{ho}$ through forward mapping of the invertible neural networks. An invertible steganography network includes 4n cascaded invertible modules, and each module includes a host branch $b_1$ and a hidden branch $b_2$. The input feature tensor divides the channel dimension into two branches and the quantity of feature channels for the branch $b_1$ is always 3, which is the same as the quantity of channels for the input host image; and the quantity of feature channels for the hidden branch $b_2$ is 3n, which is the same as the quantity of channels for the hidden images. For the l-th invertible module, input is $[b_1^l, b_2^l]$ and output is $[b_1^{l+1}, b_2^{l+1}]$ for forward mapping. A corresponding calculation method is shown in formula (1):

$$b_1^{l+1} = b_1^l + \phi(b_2^l)$$
$$b_2^{l+1} = b_2^l \odot \exp(\rho(b_1^{l+1})) + \eta(b_1^{l+1})$$
(1)

where $\phi(\cdot)$, $\eta(\cdot)$, $\rho(\cdot)$ can be any functions including a convolutional neural networks, which are all 5 layers of densely connected DenseBlock modules, the quantities of output channels at the first four layers are all 32, as shown in FIG. 3. For the module $\phi(\cdot)$, input C_in of DenseBlock is equal to the quantity of channels of the host branch $b_1$ of the invertible network, and output C_out is equal to the quantity of channels of the hidden branch $b_2$. For the modules $\eta(\cdot)$ and $\rho(\cdot)$, the case is the opposite. FIG. 2 is a schematic diagram of calculation of an invertible module, where an exponential operation $\exp(\cdot)$ of a function $\rho(\cdot)$ is omitted.

c. generating a stego image: taking 3×H×W forward output of the host branch $b_1$ of the invertible network as a stego image $y_{co}$ and making the stego image similar to the host image $x_{ho}$, and specifying forward output $\hat{y}_z$ of the hidden branch $b_2$ as a 3n×H×W constant matrix $y_z$ without effective information during training, because both input and output of each invertible module are $3(n+1)\times H\times W$ tensors. During actual application, only the synthesized stego image yeo is reserved and transmitted.

d. inputting the stego image: at a receiving end, importing the received stego image $y_{co}$ and the $3n\times H\times W$ constant matrix $y_z$ into the invertible neural networks model of reverse mapping, where $y_z$ is a fitting target of the output $\hat{y}_z$ in step c, is an arbitrary constant matrix that is set in advance, and must be consistent in step c and step d.

e. separating the image features: separating features of the host image and the hidden image from in the stego image through reverse mapping of the invertible module. For the l-th invertible module, input is $[b_1^{l+1}, b_2^{l+1}]$ and output is $[b_1^l, b_2^l]$ for the reverse mapping. A calculation method is shown in formula (2):

$$b_2^l = (b_2^{l+1} - \eta(b_1^{l+1})) \odot \exp(-\rho(b_1^{l+1}))$$
$$b_1^l = b_1^{l+1} - \phi(b_2^l) \quad (2)$$

where $\phi(\cdot)$, $\eta(\cdot)$, $\rho(\cdot)$ are the same as the functions in formula (1). For the convolutional neural networks, they have the same network structures and model parameters.

f. recovering the hidden image: taking reverse output of the host branch $b_1$ of the invertible network as a recovered host image $\hat{x}_{ho}$, and reverse output of the hidden branch $b_2$ as a recovered hidden image $\hat{x}_{hi}$.

With reference to FIG. 2, a structure of the model of an invertible neural networks is shown. When the model is trained, four items $\{y_{co}, \hat{y}_z, \hat{x}_{ho}, \hat{x}_{hi}\}$ are generated after the above steps a to f, and are used with $\{X_{ho}, Y_z, X_{ho}, X_{hi}\}$ respectively to calculate minimum absolute value deviations, that is, L1 loss, and then the parameters of convolutional layers of the sub-blocks $\phi(\cdot)$, $\eta(\cdot)$, $\rho(\cdot)$ are updated. During testing and application, the model directly loads trained parameters and performs the above steps a to f.

In Table 1, the method proposed by Shumeet Baluja's paper *Hiding images within images* in TPAMI in 2020 for hiding one or two images of the same size is taken as a benchmark method. Average PSNR and Structural Similarity (SSIM) values of test images obtained by this method and the benchmark method based on data sets ImageNet and Paris StreetView are compared. It shows that when hiding one image ($-h_1$) and two images ($-h_2$), this method gains a great improvement compared with the benchmark method.

TABLE 1

| Method | ImageNet | | Paris StreetView | |
| --- | --- | --- | --- | --- |
| | Stego image | Recovered hidden image | Stego image | Recovered hidden image |
| Method of present disclosure $-h_1$ | 38.05/.954 | 38.38/.955 | 40.49/.980 | 43.33/.991 |
| Benchmark method $-h1$ | 36.02/.946 | 32.75/.933 | 36.80/.986 | 39.03/.984 |
| Method of present disclosure $-h2$ | 36.86/.945 | 32.21/.920 | 39.14/.971 | 39.05/.982 |
| Benchmark method $-h2$ | 30.18/.919 | 29.17/.898 | 37.14/.978 | 34.73/.964 |

Figure 4:
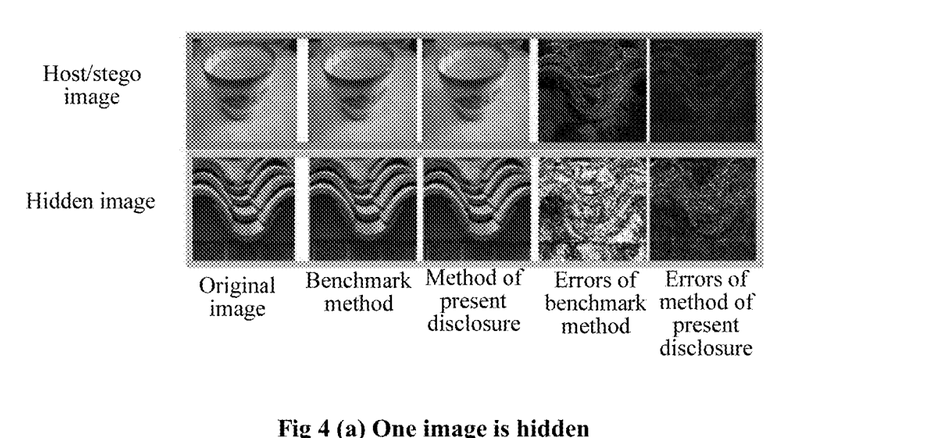
FIG. 4 is a schematic diagram of effect comparison between the present disclosure and a benchmark method.
Figure 4B:
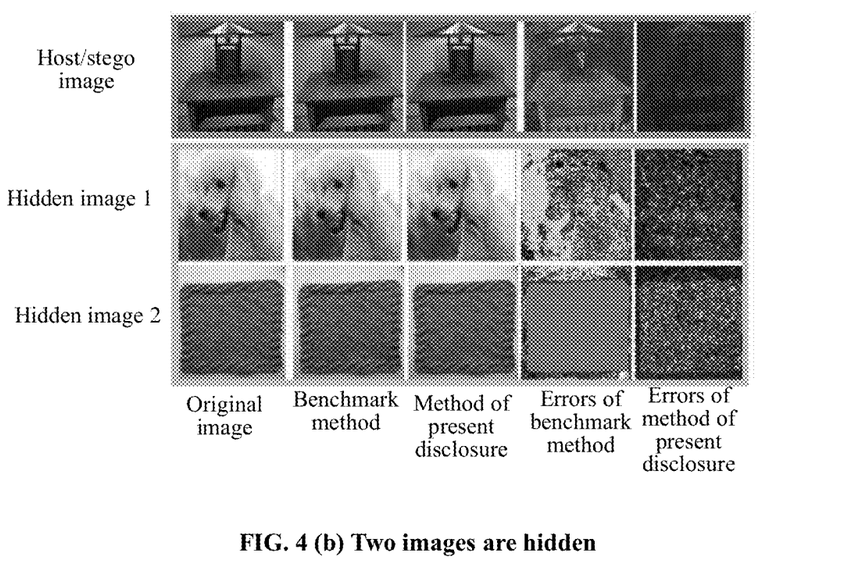

With reference to FIG. 4, a visualization comparison between the method in the present disclosure and the benchmark method when hiding one or two images is illustrated.

The method for image steganography and recovery based on an invertible neural networks in the present disclosure can obtain stego images of high quality and recovered hidden images at the same time, making an error (magnified by 50 times in the figure) between the synthesized image and the original image smaller. Herein, the smaller the error, the darker the image.

Figure 5:
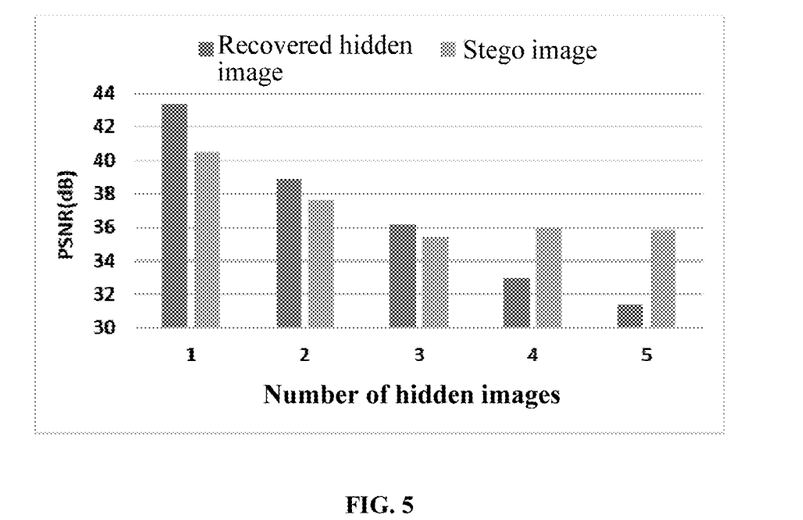
FIG. 5 is a graph of change in value of Peak Signal to Noise Ratio (PSNR) when 1 to 5 images are hidden according to the present disclosure.

Referring to FIG. 5, the PSNR values of stego images and recovered hidden images when hiding 1 to 5 images are given. Although the quality of the generated and recovered images decreases with the increase of steganography capacity, even if five images with the same size as the host image are hidden, the PSNR value of a stego image synthesized by this method is still greater than 35 dB, and the average PSNR value of all recovered hidden images is still greater than 31 dB.

Figure 6:
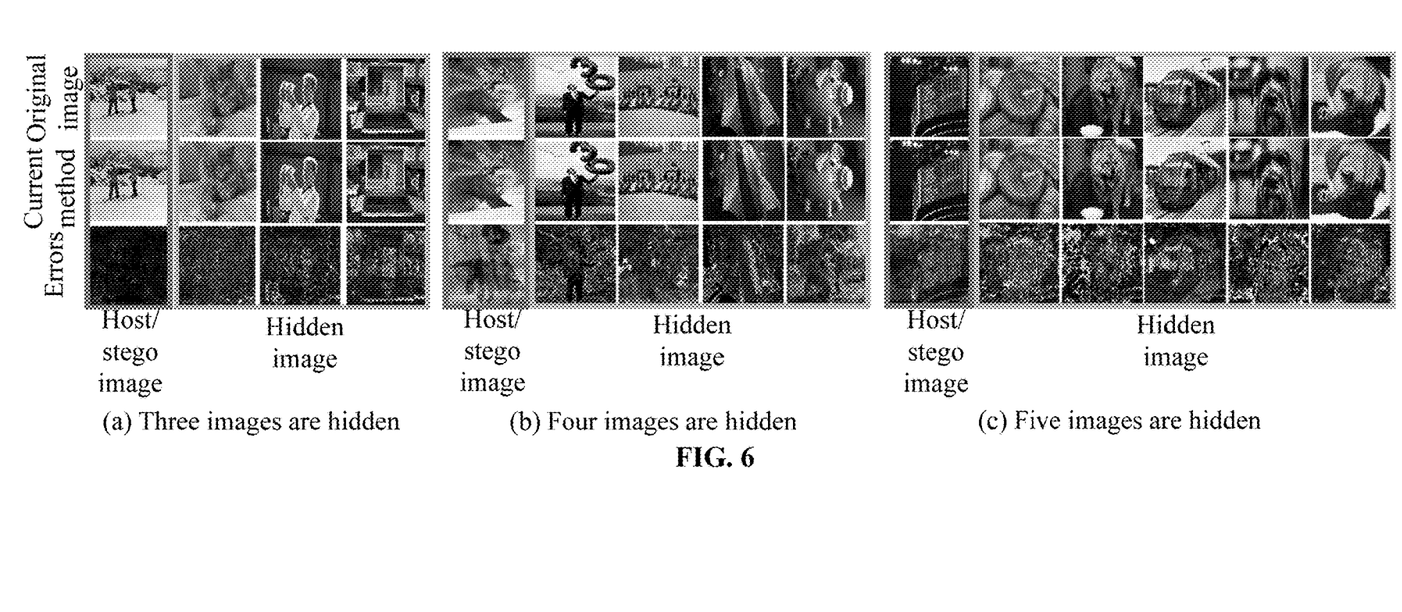
FIG. 6 is a schematic diagram of effects when 3 to 5 images are hidden according to the present disclosure.

Referring to FIG. 6, the visualization results of this method when hiding 3 to 5 images are shown, where the first row is original input images, and the second row is stego images generated or hidden images recovered by this method. This method can still achieve satisfactory results even when hiding multiple images, further improving the capacity of the image steganography.

The embodiments of the present disclosure are described in detail above with reference to the accompanying drawings, but the present disclosure is not limited to the above embodiments. Within the scope of knowledge possessed by those of ordinary skill in the art, various variations can also be made without departing from the spirit of the present disclosure.

What is claimed is:

1. A method for large-capacity image steganography and recovery based on an invertible neural networks, wherein an invertible neural networks model that supports bidirectional mapping is configured to complete tasks of embedding hidden images into a host image and recovering the hidden images from a stego image, and the invertible neural networks model comprises cascaded invertible modules containing a host branch and a hidden branch, the method comprising the following steps:

a first part: embedding hidden images a. inputting the host image and the hidden image: importing one or more hidden images and a selected host image into a forward mapping input end of the invertible neural networks model as forward inputs;

b. embedding image features: embedding feature information of the hidden image into the host image through the forward mapping of the invertible neural networks; and c. generating a stego image: taking forward output of a host branch of the invertible neural networks as the stego image, and specifying forward output of a hidden branch as a constant matrix containing no effective information;

a second part: recovering the hidden images d. inputting the stego image: importing the stego image and the constant matrix obtained in step c into a reverse mapping input end of the invertible neural networks model as reverse inputs;

e. separating the image features: separating features of the host image and the hidden image from the stego image through the reverse mapping of the invertible neural networks; and f. recovering the hidden image: taking reverse output of the host branch of the invertible neural networks as a recovered host image, and reverse output of the hidden branch as a recovered hidden image.

2. The method for large-capacity image steganography and recovery based on an invertible neural networks according to claim 1, wherein all learnable parameters are shared for the forward mapping and the reverse mapping of the invertible neural networks model.

3. A method for large-capacity image steganography based on an invertible neural networks, wherein the method for large-capacity image steganography is implemented based on the invertible neural networks, the invertible neural networks comprises invertible modules, the invertible module comprises a host branch and a hidden branch, and the method for large-capacity image steganography comprises:
inputting a host image and a hidden image;
embedding feature information of the hidden image into the host image through forward mapping of the invertible neural networks;
forwardly outputting a stego image by utilizing the host branch of the invertible neural networks, wherein the stego image is an image obtained by embedding the feature information of the hidden image into the host image; and
forwardly outputting a constant matrix by utilizing the hidden branch of the invertible neural networks, wherein the constant matrix does not contain effective information of the hidden image.

4. The method for large-capacity image steganography based on an invertible neural networks according to claim 3, wherein there are a plurality of the invertible modules in the invertible neural networks which are cascaded, and the invertible neural networks comprising the plurality of the invertible modules simultaneously completes steganography process of a plurality of the hidden images.

5. A method for large-capacity image recovery based on an invertible neural networks, wherein the method for large-capacity image recovery is applied to the method for large-capacity image steganography according to any one of claim 4, the method for large-capacity image recovery is implemented based on the invertible neural networks, the invertible neural networks comprises invertible modules which comprises a host branch and a hidden branch, and the method for large-capacity image recovery comprises:
inputting a stego image and a constant matrix, wherein the stego image is an image obtained by embedding feature information of a hidden image into a host image; and the constant matrix does not contain effective information of the hidden image;
separating features of the hidden image and the host image from the stego image through reverse mapping of the invertible neural networks;
reversely outputting a recovered host image by utilizing a host branch of the invertible neural networks; and
reversely outputting a recovered hidden image by utilizing a hidden branch of the invertible neural networks.

6. The method for large-capacity image recovery based on an invertible neural networks according to claim 5, wherein there are a plurality of the invertible modules in the invertible neural networks which are cascaded, and the invertible neural networks comprising the plurality of the invertible modules simultaneously completes recovery process of a plurality of the hidden images.

7. A system for large-capacity image recovery based on an invertible neural networks, wherein the system for large-capacity image recovery is applied to the system for large-capacity image steganography according to any one of claim 6, the system for large-capacity image recovery is implemented based on the invertible neural networks, and the invertible neural networks comprises invertible modules which comprises a host branch and a hidden branch, the system for large-capacity image recovery comprising:
an input module, configured to input a stego image and a constant matrix, wherein the stego image is an image obtained by embedding feature information of a hidden image into a host image, and the constant matrix does not contain effective information of the hidden image;
an information separation module, configured to separate features of the hidden image and the host image from the stego image through reverse mapping of the invertible neural networks;
a host image output module, configured to reversely output a recovered host image by utilizing a host branch of the invertible neural networks; and
a hidden image output module, configured to reversely output a recovered hidden image by utilizing a hidden branch of the invertible neural networks.

8. The system for large-capacity image recovery based on an invertible neural networks according to claim 7, wherein there are the plurality of the invertible modules in the invertible neural networks which are cascaded, and the invertible neural networks comprising the plurality of the invertible modules simultaneously completes recovery process of the plurality of the hidden images.

9. A system for large-capacity image recovery based on an invertible neural networks, wherein the system for large-capacity image recovery is applied to the system for large-capacity image steganography according to any one of claim 5, the system for large-capacity image recovery is implemented based on the invertible neural networks, and the invertible neural networks comprises invertible modules which comprises a host branch and a hidden branch, the system for large-capacity image recovery comprising:
an input module, configured to input a stego image and a constant matrix, wherein the stego image is an image obtained by embedding feature information of a hidden image into a host image, and the constant matrix does not contain effective information of the hidden image;
an information separation module, configured to separate features of the hidden image and the host image from the stego image through reverse mapping of the invertible neural networks;
a host image output module, configured to reversely output a recovered host image by utilizing a host branch of the invertible neural networks; and
a hidden image output module, configured to reversely output a recovered hidden image by utilizing a hidden branch of the invertible neural networks.

10. The system for large-capacity image recovery based on an invertible neural networks according to claim 9, wherein there are the plurality of the invertible modules in the invertible neural networks which are cascaded, and the invertible neural networks comprising the plurality of the invertible modules simultaneously completes recovery process of the plurality of the hidden images.

11. A method for large-capacity image recovery based on an invertible neural networks, wherein the method for large-capacity image recovery is applied to the method for large-capacity image steganography according to any one of claim 3, the method for large-capacity image recovery is implemented based on the invertible neural networks, the invertible neural networks comprises invertible modules which comprises a host branch and a hidden branch, and the method for large-capacity image recovery comprises:
inputting a stego image and a constant matrix, wherein the stego image is an image obtained by embedding feature information of a hidden image into a host image; and the constant matrix does not contain effective information of the hidden image;

separating features of the hidden image and the host image from the stego image through reverse mapping of the invertible neural networks;

reversely outputting a recovered host image by utilizing a host branch of the invertible neural networks; and reversely outputting a recovered hidden image by utilizing a hidden branch of the invertible neural networks.

12. The method for large-capacity image recovery based on an invertible neural networks according to claim 11, wherein there are a plurality of the invertible modules in the invertible neural networks which are cascaded, and the invertible neural networks comprising the plurality of the invertible modules simultaneously completes recovery process of a plurality of the hidden images.

13. A system for large-capacity image steganography based on an invertible neural networks, wherein the system for large-capacity image steganography is implemented based on the invertible neural networks, the invertible neural networks comprises invertible modules, and the invertible module comprises a host branch and a hidden branch, the system for large-capacity image steganography comprising:

an input module, configured to input a host image and a hidden image;

an information embedding module, configured to embed feature information of the hidden image into the host image through forward mapping of the invertible neural networks;

a stego image output module, configured to forwardly output a stego image by utilizing the host branch of the invertible neural networks, wherein the stego image is an image obtained by embedding the feature information of the hidden image into the host image; and a constant matrix output module, configured to forwardly output a constant matrix by utilizing the hidden branch of the invertible neural networks, wherein the constant matrix does not contain effective information of the hidden image.

14. The system for large-capacity image steganography based on an invertible neural networks according to claim 13, wherein there are a plurality of the invertible modules in the invertible neural networks which are cascaded, and the invertible neural networks comprising the plurality of the invertible modules simultaneously completes steganography process of a plurality of the hidden images.

* * * * *